(12) United States Patent  
Foss

(10) Patent No.: US 9,731,434 B2  
(45) Date of Patent: Aug. 15, 2017

(54) APPARATUS FOR THE MANUFACTURE OF A PLASTICS FILLING MATERIAL AND A METHOD OF USING THE APPARATUS

(71) Applicant: Fossfill ApS, Hellerup (DK)

(72) Inventor: Adam Foss, Hellerup (DK)

(73) Assignee: Fossflakes A/S (DK)

( * ) Notice: Subject to any disclaimer, the term of this patent is extended or adjusted under 35 U.S.C. 154(b) by 282 days.

(21) Appl. No.: 13/759,484

(22) Filed: Feb. 5, 2013

(65) Prior Publication Data

US 2013/0146687 A1    Jun. 13, 2013

Related U.S. Application Data

(63) Continuation-in-part of application No. PCT/DK2011/000085, filed on Jul. 19, 2011.

(30) Foreign Application Priority Data

Aug. 11, 2010   (DK) .................................. 2010 00705

(51) Int. Cl.
*B29B 17/04*    (2006.01)
*B02C 18/18*    (2006.01)
(Continued)

(52) U.S. Cl.
CPC .......... *B29B 17/0412* (2013.01); *B02C 18/18* (2013.01); *B02C 18/2216* (2013.01);
(Continued)

(58) Field of Classification Search
CPC ... B03B 9/00; B29B 2017/0231; B29B 17/02; B29B 17/0412; B29B 9/04;
(Continued)

(56) References Cited

U.S. PATENT DOCUMENTS 1,841,355 A * 1/1932 Bowen ........................ 241/195
2,125,352 A * 8/1938 MacDonald .................. 241/89
(Continued)

FOREIGN PATENT DOCUMENTS

CA    2055601 C    8/2001
CN    2118584 U    10/1992
(Continued)

OTHER PUBLICATIONS

Translation of JP2003-001128A, Machimoto et al., Kanegafuchi Chemical, IND, Jan. 1-7, 2003.*

(Continued)

*Primary Examiner* — Faye Francis
*Assistant Examiner* — Onekki Jolly
(74) *Attorney, Agent, or Firm* — Ware, Fressola, Maguire & Barber LLP

(57) ABSTRACT

Plastic sheet elements (19) having a size and deformation suitable for use as a filling material in pillows, duvets and the like are manufactured by feeding one or more plastic sheets to a shredding apparatus (6) which has a rotating drum (9). Loosely hanging knives (12) are mounted (11) near an outermost edge of the drum (9), and are pivoted outwards during rotation to thereby cut, deform and twist the sheet to form "curly" elements (19), which are sucked out through openings (14) in a screen (8) located below the drum (9). By adjusting the feeding of the sheet (4), the rotation of the drum (9) and the magnitude of the negative pressure, various sizes and configurations of cut individual sheet elements (19) are produced.

19 Claims, 2 Drawing Sheets

(51) Int. Cl.
*B02C 18/22* (2006.01)
*B29B 9/04* (2006.01)
B02C 23/16 (2006.01)
B29B 9/16 (2006.01)

(52) U.S. Cl.
CPC ........ *B29B 9/04* (2013.01); *B02C 2018/2208* (2013.01); *B02C 2023/165* (2013.01); *B29B 2009/168* (2013.01)

(58) Field of Classification Search
CPC .............. B29B 2009/168; B02C 18/18; B02C 18/2216; B02C 2018/2208; B02C 2023/165; B02C 18/146; B02C 13/286
USPC .... 241/24.28, 24.15, 27, 73, 186, 60, 189.1, 241/186.35
See application file for complete search history.

(56) References Cited

U.S. PATENT DOCUMENTS

| | | | | |
|---|---|---|---|---|
| 3,622,091 | A | * | 11/1971 | Bidwell ........................ 241/222 |
| 4,650,129 | A | * | 3/1987 | Newell et al. ................. 241/73 |
| 4,767,066 | A | * | 8/1988 | Williams ........................ 241/27 |
| 5,009,740 | A | * | 4/1991 | Yanai ............................ 156/353 |
| 5,314,126 | A | * | 5/1994 | Alvarez ................. B02C 13/04 241/189.1 |
| 5,445,054 | A | | 8/1995 | Pryor |
| 5,626,298 | A | * | 5/1997 | Arnoldy ................. 241/101.761 |
| 5,683,044 | A | * | 11/1997 | Gueldenpfennig et al. .... 241/73 |
| 5,887,808 | A | * | 3/1999 | Lucas ............................. 241/82 |
| 2002/0139883 | A1 | | 10/2002 | Cook |
| 2003/0019963 | A1 | * | 1/2003 | Bacher et al. .................. 241/30 |
| 2004/0129813 | A1 | * | 7/2004 | Elliott ........................ 241/188.1 |

FOREIGN PATENT DOCUMENTS

| | | |
|---|---|---|
| CN | 201329627 Y | 10/2009 |
| DE | 10 10 823 B | 6/1957 |
| EP | 0476012 B1 | 10/1995 |
| GB | 977872 A | 12/1964 |
| GB | 1428133 A | 3/1976 |
| JP | 60230921 A | 11/1985 |
| JP | 11 197605 A | 7/1999 |
| JP | H11-197605 A | 7/1999 |
| JP | 2003 001128 A | 1/2003 |
| JP | 2003001128 A | 1/2003 |
| WO | WO 9325311 A | 12/1993 |
| WO | WO 00/07425 A2 | 2/2000 |

OTHER PUBLICATIONS

International Search report for PCT/DK2011/000085, mailed Sep. 23, 2011, 3 pages.
Danish Search Report for corresponding Danish application PA 2010 00705, mailed Mar. 17, 2011.
Australian Search Report for corresponding application 2011288690, dated Jun. 18, 2014, 4 pages.
China Search Report for corresponding application 201180039517.6. dated Mar. 14, 2014, 2 pages.

* cited by examiner

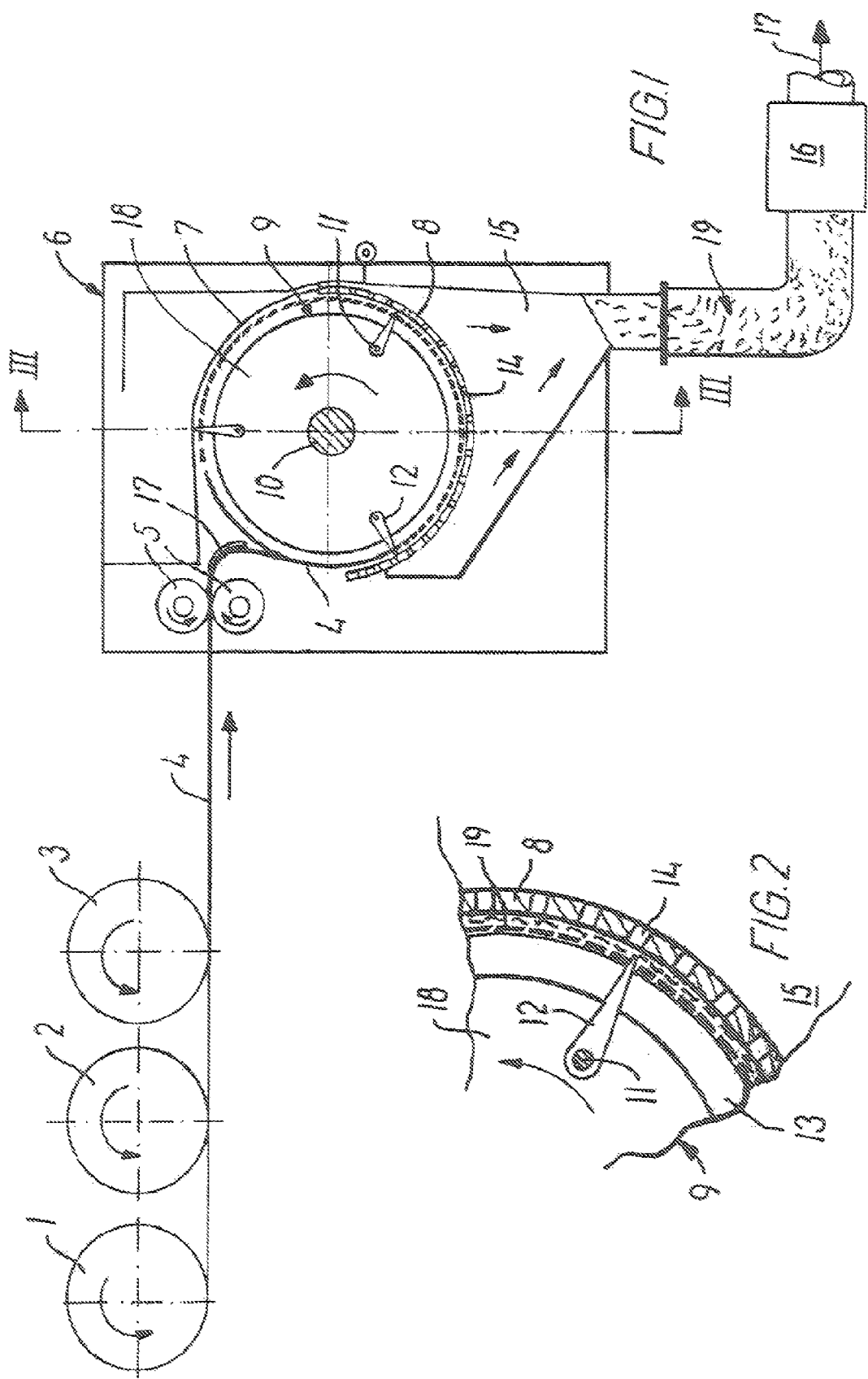

APPARATUS FOR THE MANUFACTURE OF A PLASTICS FILLING MATERIAL AND A METHOD OF USING THE APPARATUS

CROSS REFERENCE TO RELATED APPLICATIONS

This application is a continuation in part of PCT International Application no. PCT/DK2011/000085, filed 16 Feb. 2011, and claims priority in Danish patent application no. PA 2010 00705, filed 11 Aug. 2010, the contents of which are hereby incorporated by reference.

BACKGROUND

The invention relates to an apparatus, and a method of using the apparatus, for the manufacture of a filling material in the form of plastics sheet elements of individual pieces of sheet for use as a filling in pillows, duvets and the like, the sheet elements being manufactured by separation of a web of sheet. The apparatus comprises a housing in which a drum roller is rotated, with loosely hanging knives mounted on the drum, a screen extending at a distance from the outermost path of the knives, through which screen the pieces of sheet are sucked out.

Filling material of this type, comprising small sheet elements of wavy shape, is very suited as a filling in bedclothes, etc., since the material forms a filling mass which is suitably soft and resilient, and which has suitable insulating properties.

This provides the advantage that duvets, pillows, etc. may be washed at relatively high temperatures, which ensures a good hygiene in contrast to feather filling from poultry, which does not tolerate relatively high temperatures.

Previously known fillings are preferably manufactured by cutting up a layer of sheet material and deforming this material between for instance two rollers.

An example of such a manufacture of plastics sheet elements is known from EP 0 476 012. The drawback of this method is that it is very slow, and that the manufacturing capacity is poor. To this should be added a relatively large consumption of energy, and the low possibilities of switching the method to the generation of elements having a variety of sizes and shapes.

An example of a method and a hammer mill for the recovery of plastics sheet with a view to chopping the sheet to small pieces which may be re-used after cleaning of dust and similar impurities, is known from JP 2003 001128 A.

This method and hammer mill solely serve to chop the sheet into smaller pieces which, however, are not suitable for use as a filling material. This is due partly to the relatively thick sheet material which is chopped, and partly to the structure of the hammer mill with relatively long knives, which chop the sheet by a combined beating and cutting action. Therefore, the material will be chopped into small pieces which lack the ability to keep a distance to adjacent sheet elements. Thus, softness and insulation will be lacking when this material is used as a filling in pillows and the like.

SUMMARY OF THE INVENTION

It is an object of the invention to remedy these deficiencies and drawbacks, and this is achieved according to the invention by the use of a shredding apparatus, where knives are mounted on a drum at a distance from an outermost edge of the drum, which essentially corresponds to a distance between the drum and a screen.

In this surprisingly simple manner, it is possible to manufacture a considerable amount of pieces of sheet having a heretofore unknown bent shape with a consequent resilient property, thereby providing partly a great manufacturing capacity, partly a good "filling capacity" because of the very wavy elements. To this should be added the relatively great mutual distance between the individual elements and thereby the high degree of elasticity and insulating capacity. In practice, this filling has been found to be more comfortable than previously known plastics sheet fillings, since it feels and functions very much like down from poultry.

Because of the relatively short knives, an "arbitrary" wave shape of the individual elements is achieved, since the knives will deform, twist and stretch the individual elements with a relatively small impact from various directions and at various distances and thereby at various impact angles.

When several layers are fed as sheet layers put together, a multiplication of the manufacturing capacity is achieved, and also a better possibility of dimensioning the individual elements, it thus being possible to adjust the size and the shape of the individual elements during the feeding.

When sheets of sizes down to 5 and 15 μm are fed, it is possible to provide elements having the same shape as down, that is, with frayed edges and curvatures ensuring the desired effect as a filling material corresponding to natural feathers.

Finally, it is expedient to be able to adjust both the speed of rotation of the drum and the magnitude of the negative pressure, as thereby, it is possible to adjust the size and the shape of the individual plastics elements.

BRIEF DESCRIPTION OF THE DRAWINGS

An example of an embodiment of the invention will be described more fully below with reference to the drawings, in which FIG. 1 shows a section through a system for the manufacture of sheet elements seen in the direction I-I in FIG. 3;

FIG. 2 shows an enlarged section of part of a drum, a working gap and a screen;

DETAILED DESCRIPTION OF THE INVENTION

Figure 3:
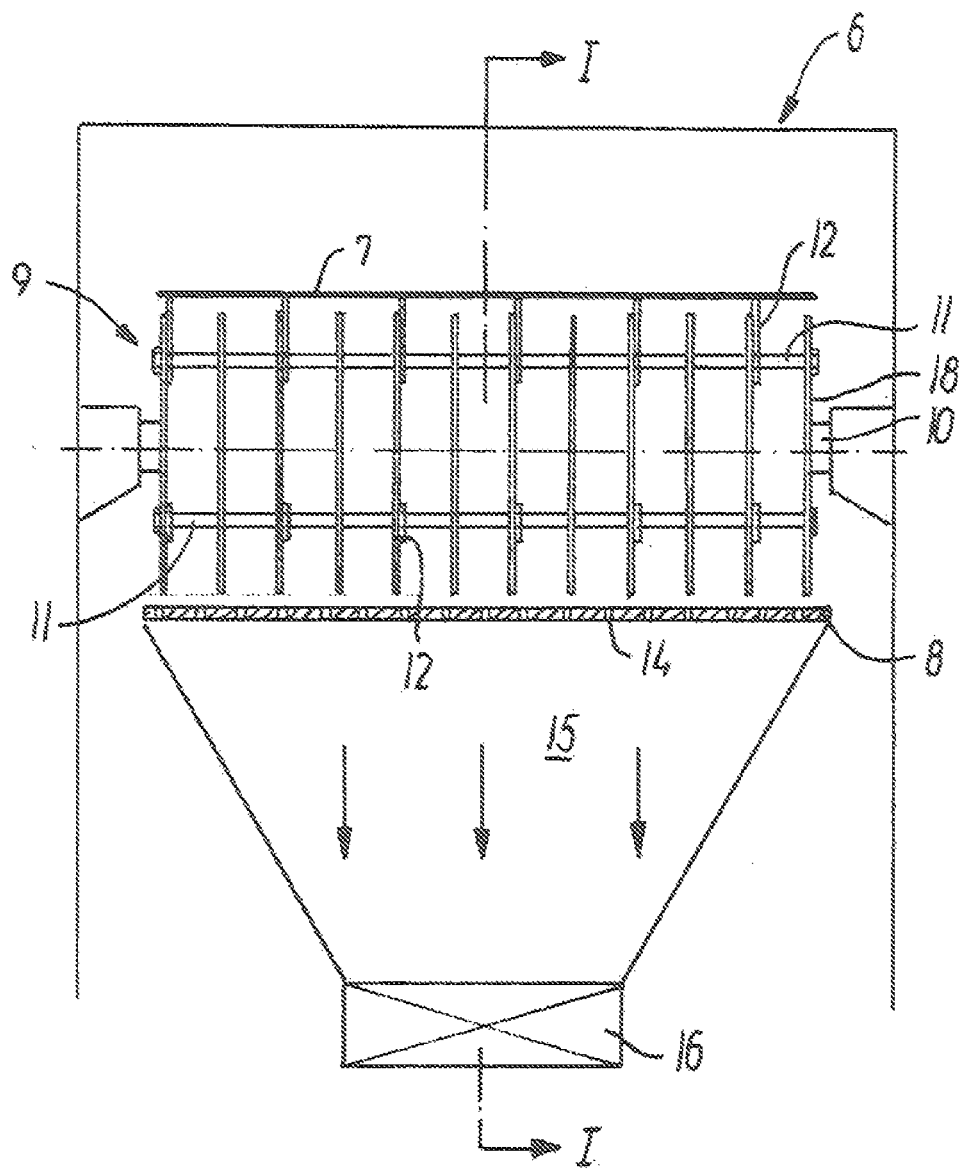
FIG. 3 shows a section through the system seen in the direction III-III in FIG. 1; and, FIG. 4 shows an enlarged sheet element according to the invention.
Figure 4:

FIGS. 1-3 show an example of a system for the manufacture of a filling material in the form of sheet elements, a single one of which is shown in FIG. 4.

The sheet used is a generally known polyethylene (PE) sheet with a thickness of about 12-18 μm, preferably between 5 and 15 μm.

As shown in FIG. 1, basically, one or more rolled-up sheets may be used. Three arranged rolls (1, 2, 3) are shown in the drawing.

From there, a web of sheet 4 is rolled out, which is then either single-layered or multi-layered, and which is fed by feeding rollers 5 to a shredder system, which is incorporated in a housing 6 in the example shown.

A drum 9 is mounted in the housing, the drum being rotated on a shaft 10 by means of a motor (not shown).

The drum 9 is composed of circular discs 18, which are mounted on the shaft 10 with spaces between adjacent discs.

Bearing rods 11 are mounted near the circumference and extend in parallel with the shaft 10, but near the circumference of the discs. FIG. 1 shows three bearing rods 11, but there may be fewer or more.

A knife 12 is suspended in each space, each knife being able to swing out and in between the discs when the drum is rotated.

The individual knives 12 serve as cutting and beating elements corresponding to choppers in a hammer mill during the rotation of the drum 9.

The drum 9 has mounted therearound a guide plate or a shield 7 at the top, a plate for guiding the web of sheet 4 after the feeding plate which serves as a guide plate 17, while a screen 8 is mounted on the lower side of the drum, the screen being curved to create a gap 13, as shown in FIG. 2.

The screen 8 is a plate in which holes or openings 14 are provided. These holes 14 have such a size that sheet elements 19 will be formed when the knives 12 work the sheet 4 against the screen 8 and the openings 14.

As will appear from FIG. 2, the individual knives 12 are relatively short, and their suspension mount 11 is disposed at a distance from the outermost edge of the drum 9, which essentially corresponds to the distance between the drum 9 and the screen 8. Each knife has a blade that, starting from a suspension mounted end of the knife, uniformly tapers down to a single sharp point at a pointed end of the knife.

The actual working takes place in the gap 13 between the discs 18 of the drum and the screen 8, as will appear from FIG. 2. It is noted that the knives 12 do not touch the screen 8 during the movement.

Below the screen 8, vacuum is established in the space 15 by means of a pump 16. This vacuum draws the sheet elements 19 out through the openings 14 and moves them further out via channels, etc. in the direction of the arrow 17.

Then, filtering of small particles, dust, etc. from the finished sheet elements 19 may take place in a generally known manner.

The method will be described now.

The drum 9 is caused to rotate at a suitable speed, which may be varied according to the dimensions of the sheet elements. Then, the feeding rollers 5, the web of sheet 4 are moved into the space 13 between the screen 8 and the knives 12 in their extended position.

The knives 12 will then work the sheet, as they will partly cut the sheet into small pieces, partly pull and twist these pieces to form a "curly" sheet element 19, as indicated in FIG. 4.

The dimensions of a single element 19 may be about 10-20 mm on each side. Following this working, the elements 19 are sucked out through the openings 14 in the screen 8 and further on for possible filtration and packaging.

The method provides a considerable degree of adjustability to achieve the specific properties of the filling material, since the speed of rotation of the drum 8, the negative pressure in the space 15 as well as the feeding speed of the sheet 4 may be adjusted to achieve the desired size and deformation i.e., "curling", that is the desired shape of the individual finished elements 19.

The invention claimed is:

1. A shredding apparatus, comprising:
    a housing;
    a drum disposed in the housing and mounted for rotation therein at a drum speed of rotation;
    a motor for rotating the drum and for adjusting the drum speed of rotation;
    plastic sheet material in one or more rolls of corresponding rolled-up sheets of the plastic sheet material;
    one or more feed rollers for rolling out one or more corresponding layers of a web of the plastic sheet material to the drum, wherein the feed rollers roll out the one or more layers from the one or more rolls of corresponding rolled-up sheets of the plastic sheet material;
    a screen positioned adjacent a lower side of the drum to define a working gap between the drum and the screen;
    loosely hanging knives, each knife having a pointed first end and a pivoted second end mounted on a respective suspension mount on the drum that permits each knife to swing out into an extended position when the drum is rotating, each knife having a blade that tapers down from the pivoted second end to a sharp point at the pointed first end, wherein the drum is composed of adjacent circular discs, mounted on a shaft, with spaces between the adjacent circular discs, wherein at least one knife is positioned in each space between the adjacent circular discs, the at least one knife configured to extend in the extended position into and across the working gap located between the discs and the screen as the drum is rotated, the blade of each knife of the loosely hanging knives for working the web when the web is moved into the working gap to produce individual shredded pieces and to deform, twist and stretch the individual shredded pieces with a relatively small impact from various directions and at various distances and thereby various impact angles, wherein when a vacuum source in fluid communication with said screen applies an adjustable negative pressure thereto the individual shredded and deformed pieces of the web of plastic sheet material are drawn through openings in the screen and collected as manufactured pillow and duvet filling material; and
    a pump for applying the adjustable negative pressure,
    wherein the loosely hanging knives are mounted on the drum at a distance from an outermost edge of the drum which substantially corresponds to a distance between the drum and the screen, wherein when the drum is rotating the knives swing out into the extended position to work the web in the working gap they do not touch the screen with the pointed first ends of the knives, and
    wherein adjustability in at least one of size and deformation of the individual shredded pieces is provided by the adjustability of the drum speed of rotation and the negative pressure.

2. A manufacturing method, comprising:
providing a shredding apparatus having a housing, a drum disposed in the housing and mounted for rotation therein at a drum speed of rotation that is adjustable, a screen positioned adjacent a lower side of the drum to define a working gap between the drum and the screen, feed rollers for rolling out one or more layers of a web of plastic sheet material from one or more corresponding rolled-up sheets to the drum, loosely hanging knives mounted on the drum, each knife having a pointed first end and a pivoted second end mounted on a respective suspension mount on the drum that permits each knife to swing out into an extended position when the drum is rotating, each knife having a blade that tapers down from the pivoted second end to a sharp point at the pointed first end, wherein the drum is composed of adjacent circular discs, mounted on a shaft, with spaces between the adjacent circular discs, wherein at least one knife is positioned in each space between the adjacent circular discs, the at least one knife extending into the working gap located between the discs and the screen as the drum is rotated, and wherein the screen is positioned at a distance from an outermost path of the knives, rotating the drum at an adjusted speed, feeding the web of plastic sheet material to the working gap of the shredding apparatus, wherein when the loosely hanging knives swing out into the extended position when the drum is rotating they do not touch the screen with the sharp points at the pointed first ends of the knives, the knives for working the web when the web is fed into the working gap so as to produce individual shredded pieces and to deform, twist and stretch the individual shredded pieces with a relatively small impact from various directions and at various distances and thereby various impact angles, applying an adjusted negative pressure to the screen for drawing the plastic sheet elements comprising individual shredded and deformed pieces of the web through openings in the screen, and collecting the shredded and deformed plastic sheet elements drawn through the screen as manufactured pillow and duvet filling material, wherein the adjusted negative pressure and the adjusted speed correspond to at least one of a selected size and deformation of the individual shredded pieces.

3. The method according to claim 2, wherein the sheet material from a rolled-up sheet has a thickness of between 5 and 18 µm.

4. The method according to claim 2, further comprising providing a motor for rotating the drum and a vacuum pump for establishing the negative pressure.

5. The method according claim 2, wherein the feed rollers roll out the one or more layers of the web of plastic sheet material to the drum at a feeding speed that is adjustable.

6. An apparatus, comprising at least one roll of plastic sheet;

a housing in which a drum is rotated on a shaft by a motor, with loosely hanging knives having pointed first ends and pivoted second ends mounted on the drum that swing out into an extended position when the drum is rotating, each knife having a blade that tapers down from the pivoted second end to a sharp point at the pointed first end, and with a screen extending at a distance from an outermost path of the knives in the extended position, through which screen, wherein the apparatus is for the manufacture of plastic sheet elements being individual shredded pieces of the plastic sheet rolled out into the drum, the sheet elements being manufactured by separation of the plastic sheet into the individual shredded pieces of the plastic sheet, wherein the knives deform, twist and stretch the individual shredded pieces with a relatively small impact from various directions and at various distances and thereby various impact angles, the apparatus further comprising a pump, wherein the individual shredded and deformed pieces of the plastic sheet are sucked out by a negative pressure applied to the screen by the pump, the drum comprising a number of circular discs mounted to a shaft with spaces between adjacent discs, the knives mounted at a mounting distance from the outermost edges of the discs, wherein the knives swing out into the extended position in a working gap to separate the plastic sheet into the individual shredded pieces of the plastic sheet when the drum is rotating wherein the sharp points at the pointed first ends of the knives do not touch the screen, wherein both a speed of rotation of the shaft and the negative pressure applied to the screen by the pump are adjustable in magnitude, and wherein the sucked out individual shredded and deformed pieces collectively comprise manufactured pillow and duvet filling material.

7. The apparatus according to claim 6, further comprising feeding rollers wherein plural layers of sheet are fed by the feeding rollers to the drum of the apparatus and the drum moves the plural layers into the working gap.

8. The apparatus according to claim 7, wherein a feeding speed of the plastic sheet to the drum is adjustable.

9. The apparatus according to claim 7, wherein thickness of the plastic sheet is between 5 and 18 µm and the individual shredded and deformed pieces have frayed edges and curvatures corresponding to natural feathers that are 10 to 20 mm on a side.

10. The apparatus according to claim 9, wherein a feeding speed of the plastic sheet to the drum is adjustable.

11. The apparatus of claim 6, wherein a feeding speed of the plastic sheet to the drum is adjustable.

12. The shredding apparatus of claim 1, wherein a feeding speed of the plastic sheet to the drum is adjustable.

13. The shredding apparatus of claim 1, further comprising a plurality of bearing rods mounted so as to extend in parallel with the shaft near a circumference of the adjacent circular discs, each bearing rod disposed at a distance from an outermost edge of the drum that corresponds to a distance between the drum and the screen, wherein each knife of the loosely hanging knives is mounted on a corresponding bearing rod and has a length such that it does not touch the screen when it extends into the working gap as the drum is rotated.

14. The method of claim 2, wherein the shredding apparatus comprises a plurality of bearing rods mounted so as to extend in parallel with the shaft near a circumference of the adjacent circular discs, each bearing rod disposed at a distance from an outermost edge of the drum that corresponds to a distance between the drum and the screen, wherein each knife of the loosely hanging knives is mounted on a corresponding bearing rod and has a length such that it does not touch the screen when it extends into the working gap as the drum is rotated.

15. The apparatus of claim 6, further comprising a plurality of bearing rods mounted so as to extend in parallel with the shaft near a circumference of the adjacent circular discs, each bearing rod disposed at the mounting distance from the outermost edge of the drum that corresponds to a distance between the drum and the screen, wherein each knife of the loosely hanging knives is mounted on a corresponding bearing rod and has a length such that it does not touch the screen when it extends into the working gap when the drum is rotating.

16. The shredding apparatus of claim 13, wherein each knife of the loosely hanging knives is mounted on an end of the corresponding bearing rod on the respective suspension mount adjacent a corresponding one of the circular discs.

17. The method of claim 14, wherein each knife of the loosely hanging knives is mounted on the corresponding bearing rod adjacent a corresponding one of the circular discs.

18. The apparatus of claim 15, wherein each knife of the loosely hanging knives is mounted on the corresponding bearing rod adjacent a corresponding one of the circular discs.

19. The shredding apparatus according to claim 1, wherein a thickness of the plastic sheet is between 5 and 18 µm and the shredded and deformed plastic sheet elements with frayed edges and curvatures corresponding to natural feathers that are 10 to 20 mm on a side.

\* \* \* \* \*